United States Patent [19]
Johnson

[11] Patent Number: 5,010,733
[45] Date of Patent: Apr. 30, 1991

[54] HYDROSTATIC TRANSMISSION WITH HYDRAULIC BYPASS AND AIR BLEED

[75] Inventor: Alan W. Johnson, Ames, Iowa

[73] Assignee: Sauer-Sundstrand Inc., Ames, Iowa

[21] Appl. No.: 328,470

[22] Filed: Mar. 24, 1989

[51] Int. Cl.[5] .......................................... F16D 31/02
[52] U.S. Cl. ....................................... 60/453; 60/464; 60/489; 60/494
[58] Field of Search ................. 60/468, 464, 453, 378, 60/494, 487, 489

[56] References Cited

U.S. PATENT DOCUMENTS

| | | | |
|---|---|---|---|
| 4,856,264 | 8/1989 | Nishimura et al. | 60/487 |
| 4,891,943 | 1/1990 | Okada | 60/494 |
| 4,893,524 | 1/1990 | Ohashi et al. | 60/490 |
| 4,899,541 | 2/1990 | Okada et al. | 60/464 |
| 4,903,545 | 2/1990 | Louis et al. | 74/83 |
| 4,905,472 | 3/1990 | Okada | 60/494 |
| 4,914,907 | 4/1990 | Okada | 60/487 |
| 4,922,787 | 5/1990 | Fujisaka et al. | 74/606 R |
| 4,932,209 | 6/1990 | Okada et al. | 60/487 |

FOREIGN PATENT DOCUMENTS

| | | | |
|---|---|---|---|
| 455931 | 4/1949 | Canada | 60/487 |
| 192827 | 2/1923 | United Kingdom | 60/487 |

Primary Examiner—Edward K. Look
Assistant Examiner—Christopher M. Verdier
Attorney, Agent, or Firm—Wood, Phillips, Mason, Recktenwald & VanSanten

[57] ABSTRACT

A hydrostatic transmission having a housing with a sump and a pair of hydraulic displacement units interconnected by first and second fluid passages. A pair of bypass valves can be opened to place said first and second fluid passages in fluid communication. A recess, formed in the lower part of the housing, holds make-up oil and communicates with said first and second fluid passages when the bypass valves are opened. A passage extends upwardly from the housing recess and has its upper end normally sealed by seal means. A manually operable bypass rod extends lengthwise of the passage into the area of the housing recess and has structure associated therewith for causing opening of the bypass valves. The seal means is in the form of a washer fastened to the bypass rod whereby upward movement of the bypass rod to open the bypass valves moves the washer away from the upper end of the passage whereby air bubbles that have collected in the upper part of the passage during a bypass operation can rise out of the passage and escape into the upper part of the housing.

10 Claims, 4 Drawing Sheets

HYDROSTATIC TRANSMISSION WITH HYDRAULIC BYPASS AND AIR BLEED

DESCRIPTION

1. Technical Field

This invention pertains to a hydrostatic transmission having means for hydraulic bypass and air bleed of air from the oil in the hydraulic circuit.

It is known to have a hydrostatic transmission with bypass valves to achieve a bypass operation wherein there is pump operation without motor operation. The hydrostatic transmission disclosed herein has components constructed and related whereby air bubbles can collect in a passage during the bypass operation and a seal means, which normally closes off the passage, opens, upon operation of the bypass valves, to permit air bubbles to bleed off into the interior of a housing for the hydrostatic transmission.

2. Background Art

In certain uses of hydrostatic transmissions it is desirable for the transmission to have a bypass operation which is achieved by the operation of one or more bypass valves. Provision is made for delivery of make-up oil to the closed hydraulic circuit of the hydrostatic transmission and it is important to remove air bubbles from the fluid in the hydraulic circuit. The elimination of air in the hydraulic circuit with high volumetric efficiency is difficult, particularly without the use of a pressurized recharging circuit for supplying make-up oil to the hydraulic circuit. One expensive solution to the problem is the use of a valve in addition to the bypass valves to leak oil and entrained air.

DISCLOSURE OF THE INVENTION

A primary feature of the invention is to provide a hydrostatic transmission with provision for elimination of air from the hydraulic circuit between the hydraulic pump and motor of the hydrostatic transmission as part of a hydraulic bypass operation.

More particularly, a pair of bypass valves are associated with fluid passages interconnecting the hydraulic pump and motor and these fluid passages are placed in communication with an additional passage when the bypass valves are open for a hydraulic bypass operation. Air bubbles in the oil collect in said additional passage which has its upper end normally sealed by a seal means. However, the seal means opens when the bypass valves are opened to permit air to bleed from the passage past the seal means.

In a particular embodiment of the invention, the hydrostatic transmission has a housing and a pair of hydraulic displacement units in the housing each having a rotatable cylinder block. A member positioned between the cylinder blocks has pairs of ports associated one with each rotatable cylinder. First and second fluid passages connect the ports. Third and fourth fluid passages intersect the first and second fluid passages and terminate at a recess in the lower part of the housing. A pair of vertically oriented bypass valves are positioned one in each of the third and fourth fluid passages. A bypass rod and associated structure is manually operable to open both bypass valves to connect the third and fourth fluid passages to the housing recess to achieve a bypass operation. A passage extends upwardly from the housing recess and movably receives the bypass rod. The passage has its upper end normally sealed by a washer on the bypass rod whereby, when the bypass rod is lifted for a bypass operation, the seal washer is moved away from the end of the passage to permit air to rise and escape from the fluid circuit. The oil level in the housing is above the upper end of the passage and the seal washer functions, when closed against the upper end of the passage, to prevent entry of unfiltered oil into the active hydraulic circuit.

An object of the invention is to provide a hydrostatic transmission comprising, a housing with a sump, a pair of hydraulic displacement units in said housing each having a rotatable cylinder block, means positioned between said cylinder blocks providing a pair of ports coacting with each cylinder block, a first fluid passage connecting one port of each pair, a second fluid passage connecting the second ports of each pair, a recess at the bottom of the housing having filtered make-up oil, a pair of bypass valves normally closed to prevent flow of pressure fluid from either of said first and second passages to said housing recess, means operable to open said bypass valves to connect the first and second passages for a bypass operation, a passage extending upwardly from said housing recess and opening to the upper interior of the housing, movable seal means at the upper end of the passage for sealing the passage, and means for opening the seal means in response to opening the bypass valves.

Still another object of the invention is to provide a hydrostatic transmission as defined in the preceding paragraph wherein the bypass valves are check valves located at the lower ends of third and fourth vertical fluid passages associated with the first and second fluid passages, respectively, with the third and fourth fluid passages communicating with said housing recess and the seal means is a washer on a bypass rod operable to open the bypass valves and, in such operation, the washer is moved away from the upper end of the passage to permit bleed of air upwardly out of said passage.

DESCRIPTION OF THE EMBODIMENTS

Figure 1:
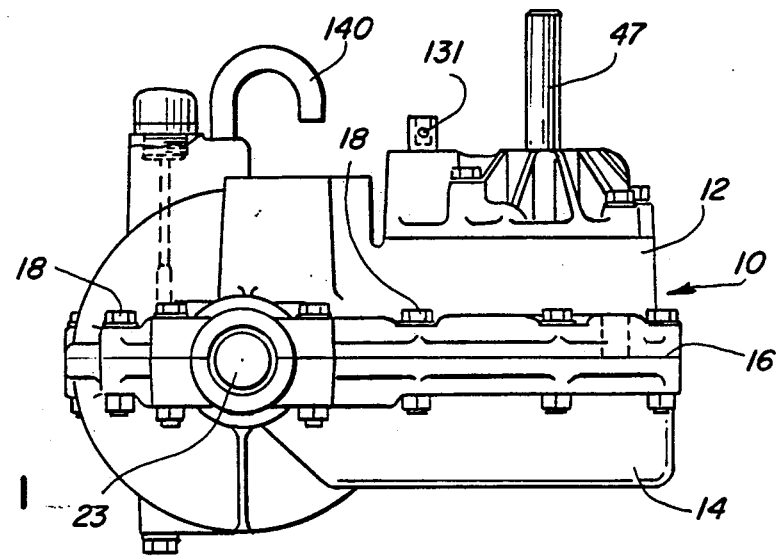
FIG. 1 is a side elevation view of the integrated hydrostatic transaxle, taken looking toward the left in FIG. 2.
Figure 2:
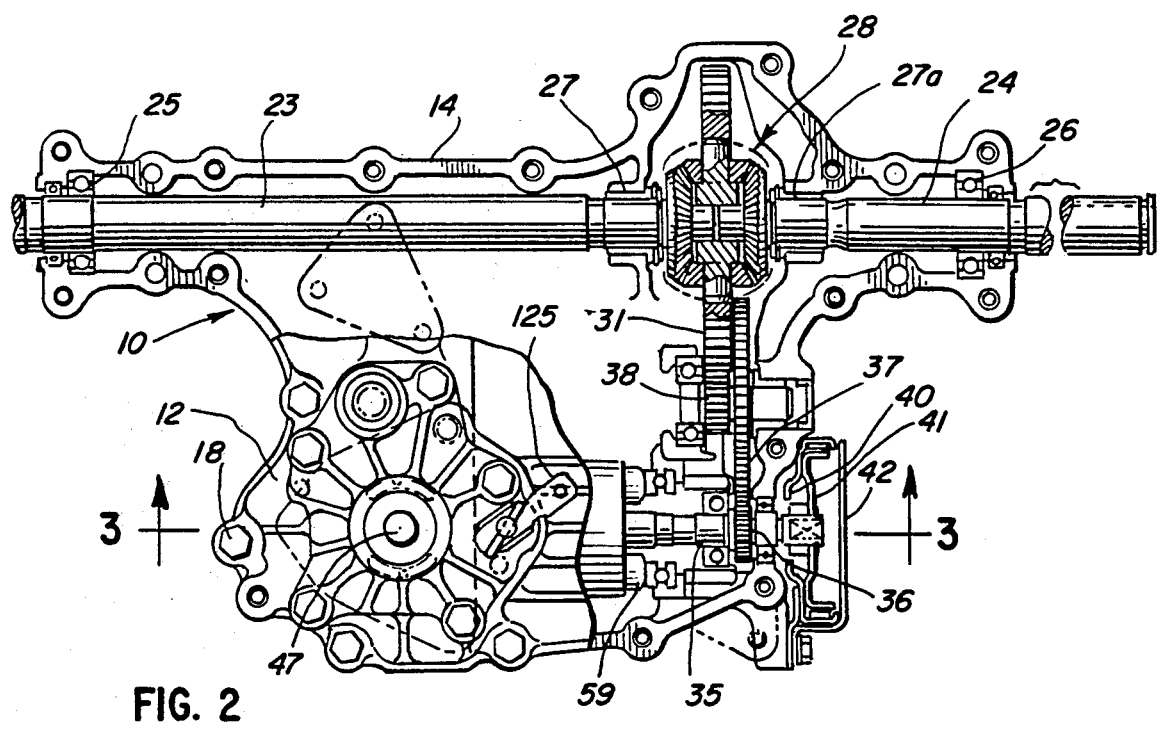
FIG. 2 is a plan view of the integrated hydrostatic transaxle, with parts broken away.
Figure 3:
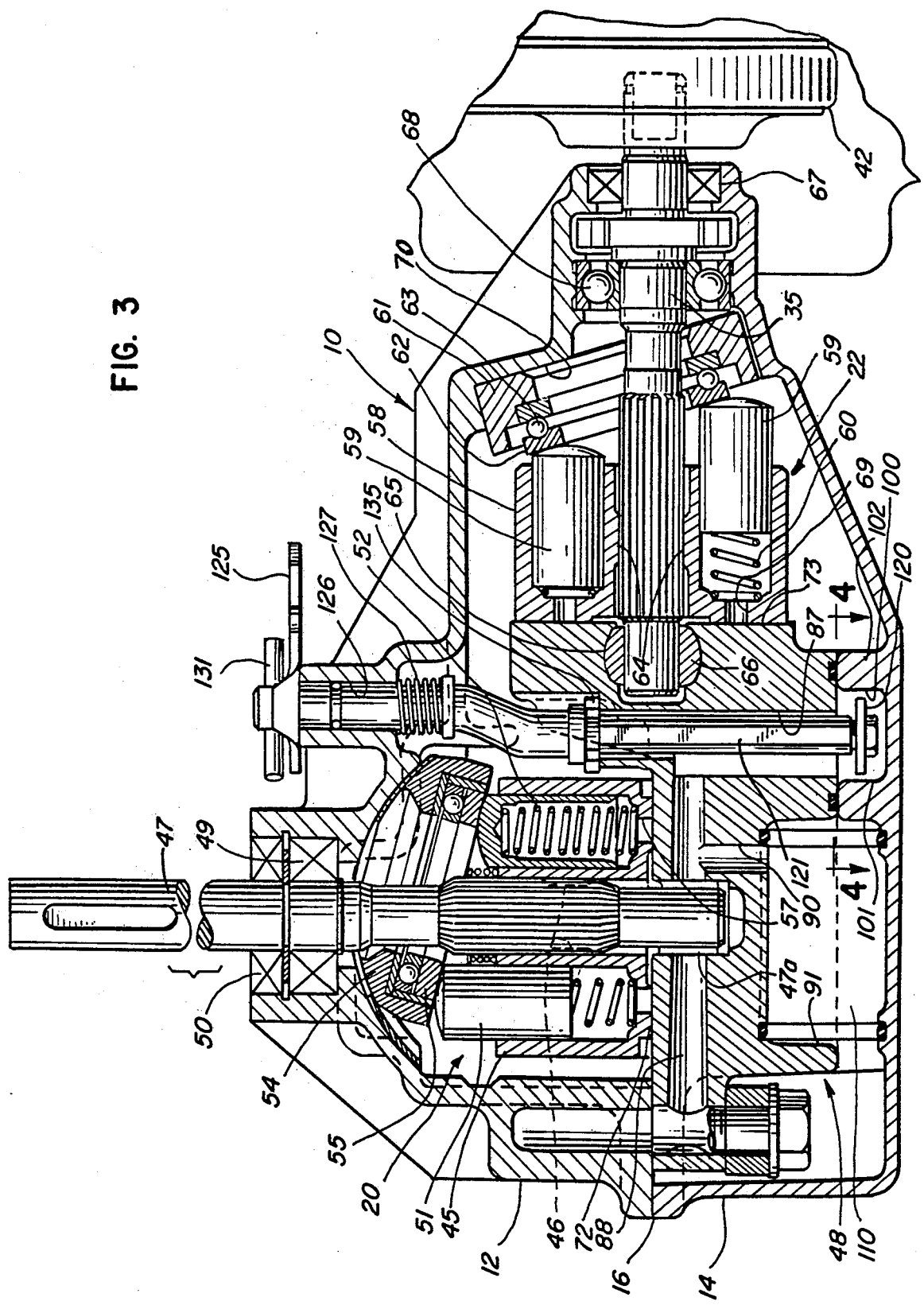
FIG. 3 is a vertical section, taken along the line 3—3 in FIG. 2, and on an enlarged scale.

The integrated hydrostatic transaxle is shown generally in FIGS. 1 to 3.

The integrated hydrostatic transaxle has a common housing 10 for the components thereof. The common housing 10 is of two parts, with a top part 12 and a bottom part 14 which are joined together along a split line 16 which is disposed generally horizontal when the integrated hydrostatic transaxle is installed in operative position. The housing parts 12 and 14 are held in assembled relation by a series of bolts 18 extending through peripheral flanges of the top and bottom housing parts which abut at the split line 16.

The shape of the housing parts in plan is shown in FIG. 2 wherein a portion of the top housing part 12 is seen in the lower left part of the Figure and with the remainder thereof broken away to show the bottom housing part 14.

The common housing 10 encloses a hydrostatic transmission having a pair of hydraulic displacement units, indicated generally at 20 and 22, respectively, and also houses transaxle components, seen particularly in FIG. 2. The transaxle components include a pair of oppositely-extending axles 23 and 24 having ends extended beyond the bottom housing part for mounting of drive wheels (not shown) and their centerlines are coincident with the housing split line 16. Axles have bearings 25 and 26 at their outboard ends and thrust bearings 27 and 27a at their inboard ends for rotatable support thereof and with the axles being geared together through a differential, indicated generally at 28. A gear 31 meshes with a gear 38. The gear reduction drive has a drive input connection from the hydraulic displacement unit 22, with the output shaft 35 (FIG. 3) of the latter having a gear 36 which meshes with a gear 37. The latter gear is rotatably fixed to the gear 38.

A brake for the drive is mounted externally of the common housing 10 and associated with an end of the drive output shaft 35, with this brake structure, including a brake 40, a brake drum 41 and a brake cover 42.

Each of the hydraulic displacement units 20 and 22 is shown in detail in FIG. 3 and is of generally the same construction. The hydraulic displacement unit 20 has a rotatable cylinder block 45 connected by a splined connection 46 to a drive input shaft 47 having an internal end rotatable in a journal 47a positioned in a one-piece center section, indicated generally at 48, of the hydrostatic transmission. The outboard end of the drive input shaft 47 is rotatably supported by the top housing part 12 by means of a bearing 49. A lip seal 50 seals the shaft opening in the top housing part 12.

The rotatable cylinder block 45 has a series of piston-receiving chambers, each of which movably mount a piston 51 of a relatively large diameter and with each of the pistons 51 being urged by an associated spring 52 into following engagement with a swashplate structure. The hydraulic displacement unit 20 has overcenter variable displacement, with this operation being achieved by angular adjustment of a swashplate 54 which, as well known in the art, can have its angle varied from the clockwise position shown in FIG. 3 to an opposite extreme position in a known manner and by a manually operable structure, not shown. The swashplate can pivot about a pivot axis in a counterclockwise direction and past a horizontal center position, as viewed in FIG. 3. The swashplate 54, as known in the art, mounts a thrust plate 55 against which the pistons abut and a bearing and bearing guide structure rotatably support the thrust plate 55 relative to the body of the swashplate.

Each of the piston-receiving chambers has a passage 57 opening to a face of the rotatable cylinder block 45 for coaction with arcuate ports of the center section 48 which will be described subsequently.

The hydraulic displacement unit 22 is a fixed displacement unit and has a rotatable cylinder block 58 with a plurality of piston-receiving chambers each movably mounting a piston 59 which is spring-urged by a spring 60 toward a swashplate 61. The swashplate 61 has a thrust plate 62 against which an end of the pistons engages and a ball thrust bearing 63 interposed between the thrust plate and the swashplate to rotatably mount the thrust plate.

The rotatable cylinder block 58 drives the drive output shaft 35 through a splined connection 64 therebetween.

Figure 11:
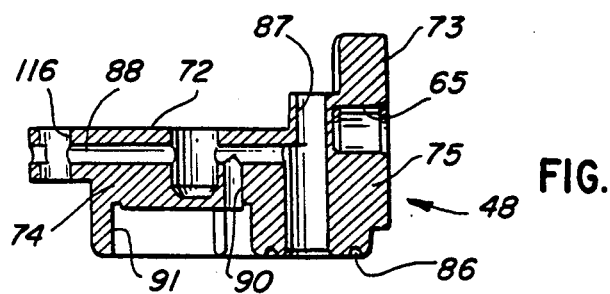
FIG. 11 is a vertical section of the center section, taken along the line 11—11 in FIG. 8 and with the structure associated with the center section being omitted.

An inner end of the drive output shaft 35 rotates within an opening 65 in the center section 48 which may optionally receive a journal 66 and, if the journal is not used, or a cylindrical journal is used, the opening 65 is cylindrical as shown in FIG. 11. The outboard end of the drive output shaft 35 is sealed by a lip seal 67 and with bearing structure disposed interiorly thereof including a ball bearing 68.

Each of the piston-receiving chambers of the rotatable cylinder block 58 has a passage 69 opening to a face thereof which coact with arcuate ports associated with a face of the center section 48 to be subsequently described.

Since the hydraulic displacement unit 22 is of a fixed displacement, the swashplate 61 need not be adjustably mounted and, therefore, can be supported by the common housing 10 against hydraulic forces exerted through the pistons 59. As seen in FIG. 3, the centerline of the drive output shaft 35 is located on the split line 16 of the housing parts 12 and 14 and extends through a central opening 70 in the swashplate 61. The swashplate 61 spans the split line and support thereof against fluid forces is provided by the common housing at both sides of the split line.

The foregoing description generally describes the integrated hydrostatic transaxle wherein the bottom housing part 14 provides a common sump for the transaxle components as is evident in FIGS. 1 and 2 and also for the hydrostatic transmission as is evident from FIGS. 1 to 3.

The hydraulic displacement units 20 and 22 have their respective rotatable cylinder blocks arranged with their axes of rotation generally at right angles to each other. It is the primary function of the center section 48 to provide communication between selected piston-receiving chambers of the respective cylinder blocks 45 and 58. The one-piece center section 48 is generally L-shaped to have a pair of faces generally at right angles to each other with one planar face 72 coacting with a face of the rotatable cylinder block 45 of the variable displacement unit 20 and a second planar face 73 coacting with a face of the rotatable cylinder block 58 of the hydraulic displacement unit 22. The center section body has two integral parts 74 and 75 oriented to have the two parts define the legs of the L shape of the center section, with the part 74 having the planar face 72 and the part 75 having the planar face 73.

Figure 8:
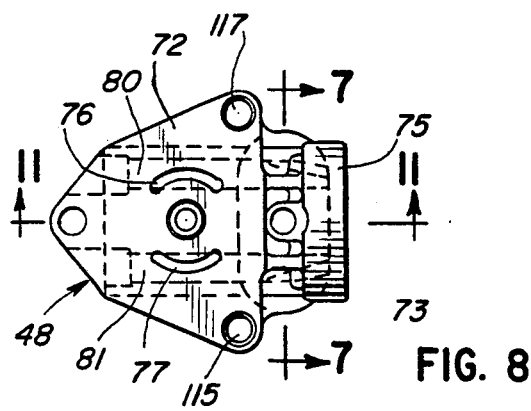
FIG. 8 is a top view of the center section for the hydrostatic transmission.
Figure 10:
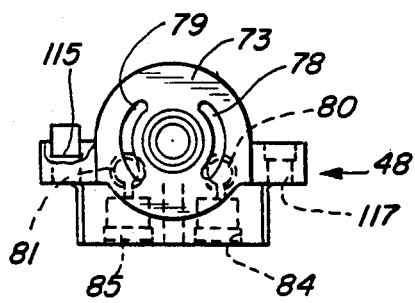
FIG. 10 is a side elevation of the center section, looking toward the right side thereof, as shown in FIG. 8.
Figure 9:
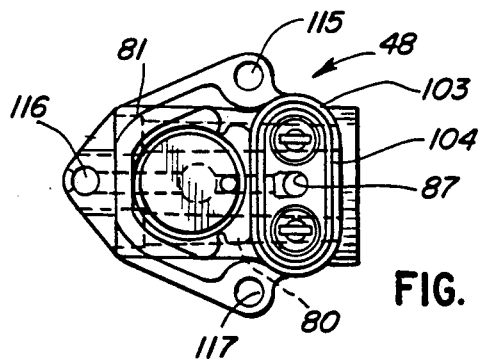
FIG. 9 is a bottom view of the center section of the hydrostatic transmission.

The planar face 72 has a pair of arcuate ports 76 and 77 and the planar face 73 has a pair of arcuate ports 78 and 79, as seen in FIGS. 8 and 10, respectively.

First and second straight, generally parallel fluid passages 80 and 81 are cast into the center section body and function to intersect the arcuate ports and place the arcuate ports in paired relation for fluid communication. The first fluid passage 80 intersects with arcuate port 76 and arcuate port 78 to provide a first pair of ports in fluid communication. The second fluid passage 81 intersects arcuate ports 77 and 79 and places them in paired fluid communication.

In operation of the integrated hydrostatic transaxle, one or the other of the first and second fluid passages functions to deliver fluid under pressure from the variable displacement unit 20 functioning as a pump to the fixed displacement unit 22, functioning as a motor, and with the other fluid passage providing for return of fluid from the motor to the pump. The first and second fluid passages 80 and 81 terminate at one end at their intersection with the arcuate ports 78 and 79 and are closed at their other end as formed in the casting process.

The center section 48 has a third fluid passage 84 intersecting said first fluid passage 80 and a fourth fluid passage 85 intersecting the second fluid passage 81. The fluid passages 84 and 85 extend vertically and open to a surface 86 of the center section opposite to the planar face 72.

A vertical through bore 87, defining a passage for purposes to be described, extends perpendicular to and is positioned between the first and second fluid passages 80 and 81. A fifth fluid passage 88, sealed intermediate its ends by journal 47a, extends generally perpendicular to the through bore 87 and is positioned between the first and second fluid passages 80 and 81. A sixth fluid passage 90 extends between and normal to the fifth fluid passage 88 and a recess 91 in the center section set back from the surface 86 of the center section.

The utility of the through bore and third through sixth passages will be readily understood by reference to FIGS. 3 to 7 and the following description.

The third and fourth fluid passages 84 and 85 mount, at their lower ends, a pair of upright bypass valves in the form of check valves with each having a tubular seat member 93 and 94, respectively, fitted therein and which form seats for a pair of check valve balls 95 and 96 spring-urged downwardly against the seats. The check valves function, when closed, to block fluid flow from either of the first and second fluid passages 80 and 81 to a housing recess 100 (FIG. 3) formed by a cavity in the bottom housing part 14. This recess is generally oval and is defined by a continuous upstanding wall on the bottom housing part with wall sections shown at 101 and 102. The lower ends of the third and fourth fluid passages 84 and 85 open into this generally oval recess. The oval recess 100 is sealed off, at its top, by a generally oval-shaped wall 103 on the underside of the center section 48 and a sealing O-ring 104 is positioned therebetween. When a seal washer 135, to be described, is seated, this is a sealed housing recess, except for communication with a source of make-up oil, so that filtered fluid in the housing recess may be a source of make-up fluid to the hydrostatic transmission when a check valve opens. Structure associated with the check valves also provides for a bypass function. This bypass function enables rotation of the motor as the axes rotate, even though the pump is set for no displacement or wherein, even though the pump is set at a displacement and is operable, there is no drive of the motor. This results because the first and second fluid passages 80 and 81 are cross-connected through opening of the check valves to the generally oval housing recess 100.

The make-up fluid is delivered to the housing recess from the common sump within the bottom housing part 14 by gravity flow through an open space beneath the center section 48 (FIG. 3) and through a cylindrical filter 110 having O-ring seals at its top and bottom. The interior of the filter 110 communicates with the sixth fluid passage 90 in the center section. As previously described, the sixth fluid passage 90 communicates with the fifth fluid passage 88 and the fifth fluid passage 88 communicates with the through bore 87 so that fluid reaches the housing recess.

The center section has a series of through mounting holes at 115, 116, and 117 whereby, as seen in FIG. 3, in assembly, the center section 48 can be secured to the upper housing part 12, as by self-tapping screws 118 and the final assembly achieved by bringing the bottom housing part 14 into association with the top housing part 12 along the split line 16.

Figure 4:
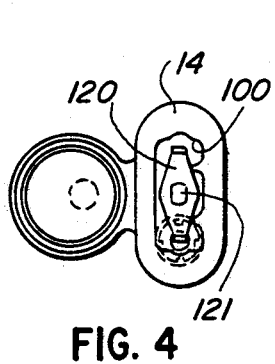
FIG. 4 is a fragmentary section of the bottom part of the housing and structure related thereto, as taken along section 4—4 in FIG. 3.
Figure 5:
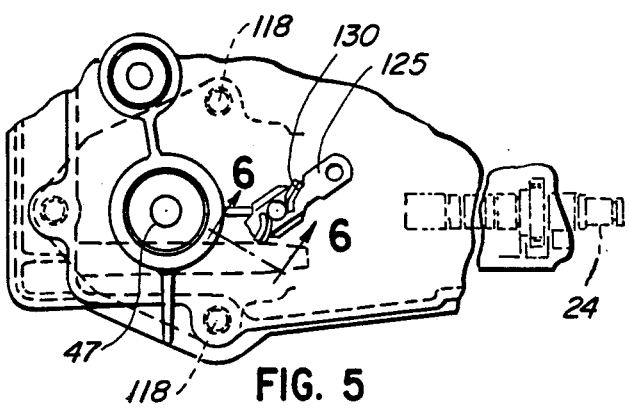
FIG. 5 is a fragmentary plan view of structure shown in FIG. 2.
Figure 6:
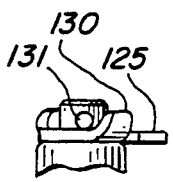
FIG. 6 is a fragmentary section, taken along the line 6—6 in FIG. 5.
Figure 7:
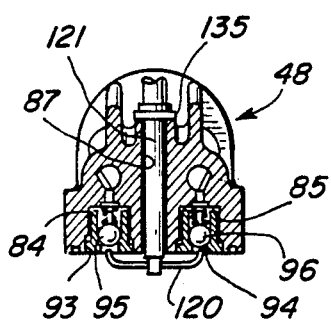
FIG. 7 is a vertical section of the center section, taken along the line 7—7 in FIG. 8 and with check valve and bypass structure shown in association therewith.

The bypass operation previously referred to is effected by opening the check valves by raising the check valve balls 95 and 96 off their seats. The structure for this includes a bypass actuator structure including a bypass actuator plate 120 and a bypass rod 121. The bypass actuator plate 120, as seen in FIGS. 4 and 7, is positioned in the generally oval housing recess 100 in the bottom housing part 14 and, at its middle, is connected to the lower end of the bypass rod 121 and has a pair of upturned ends (FIG. 7) positioned beneath the check valve balls 95 and 96. Lifting of the bypass rod 121 causes the bypass actuator plate to lift the check valve balls and place the center section first and second fluid passages 80 and 81 in fluid communication. Lifting of the bypass rod 121 is achieved by rotation of a handle 125 positioned above top housing part 12 and, as seen particularly in FIGS. 2, 3 and 5. The bypass rod 121 is longitudinally movable in an opening 126 in the top housing part 12 and has its lower part extending downwardly within the passage defined by the through bore 87 of the center section and is normally urged downwardly by a spring 127. The through bore 87 has a diameter substantially larger than the diameter of the bypass rod to provide a clearance for collection of air bubbles. As seen in FIG. 6, the handle 125 has cam shapes 130 formed thereon which coact with ends of a through pin 131 fitted into an end of the bypass rod 121. Rotation of the handle 125 from the position shown in the drawings to bring the cams 130 under the through pin 131 raises the through pin and the bypass rod 121 to establish the bypass operation.

The bypass rod 121 and center section 48 are uniquely associated with the housing structure whereby a bypass operation also results in bleeding air from the system fluid. During a bypass operation, air bubbles tend to collect in the passage surrounding the bypass rod 121. When the bypass rod 121 is in its lower position and the check valves are closed, the upper end of the passage defined by the through bore 87 of the center section 48 is closed by a seal washer 135 on the bypass rod and backed up by a peripheral flange on the bypass rod. The washer defines seal means which, when closed, blocks fluid communication between the through bore 87 and the upper interior of the common housing 10. This prevents entry of unfiltered oil from the housing sump into the passage. When the bypass rod 121 is raised to effect a bypass operation, the seal washer 135 is moved upwardly from its seat on the center section whereby the upper end of the through bore 87 is open to the interior of the common housing and air bubbles can rise through oil in the sump and bleed off to the housing interior. Air that accumulates in the housing above the fluid level can bleed off to atmosphere through the bleed tube 140 (FIG. 1).

It is believed that the operation of the integrated hydrostatic transaxle, as shown in FIGS. 1–11, is clearly apparent from the foregoing description. However, it may be briefly summarized as follows. An engine drives the drive input shaft 47 for the variable displacement unit 20 (functioning as a pump) to cause operation of the displacement unit 22 (functioning as a motor) and the drive output shaft 35 drives the transaxle components shown in FIG. 2 for rotation of the wheel axles 23 and 24. The direction of rotation of the wheel axles can be shifted from forward to reverse by shifting the swashplate 54 of the variable displacement unit 20 to a position opposite side of center from that shown in FIG. 3 and with resulting reversal of pressure fluid flow through the center section 48 from the pump to the motor. In the event there is to be rotation of the wheel axles 23 and 24 when the pump is not operating and not set for displacement, a bypass operation is achieved by rotation of the handle 125 to raise the bypass rod 121 and open the check valve balls 95 and 96. As previously mentioned, any air bubbles in the fluid passages in the center section can bleed to the sump of the common housing past the seal washer during the bypass operation. Either one of the check valves can automatically open to provide make-up fluid to the transmission circuit from the generally oval housing recess 100 when the pressure existing in one or the other of the first and second straight passages 80 and 81 in the center section is sufficiently less than that of the fluid in the oval housing recess to overcome the spring closing force on a check valve ball.

Figure 12:
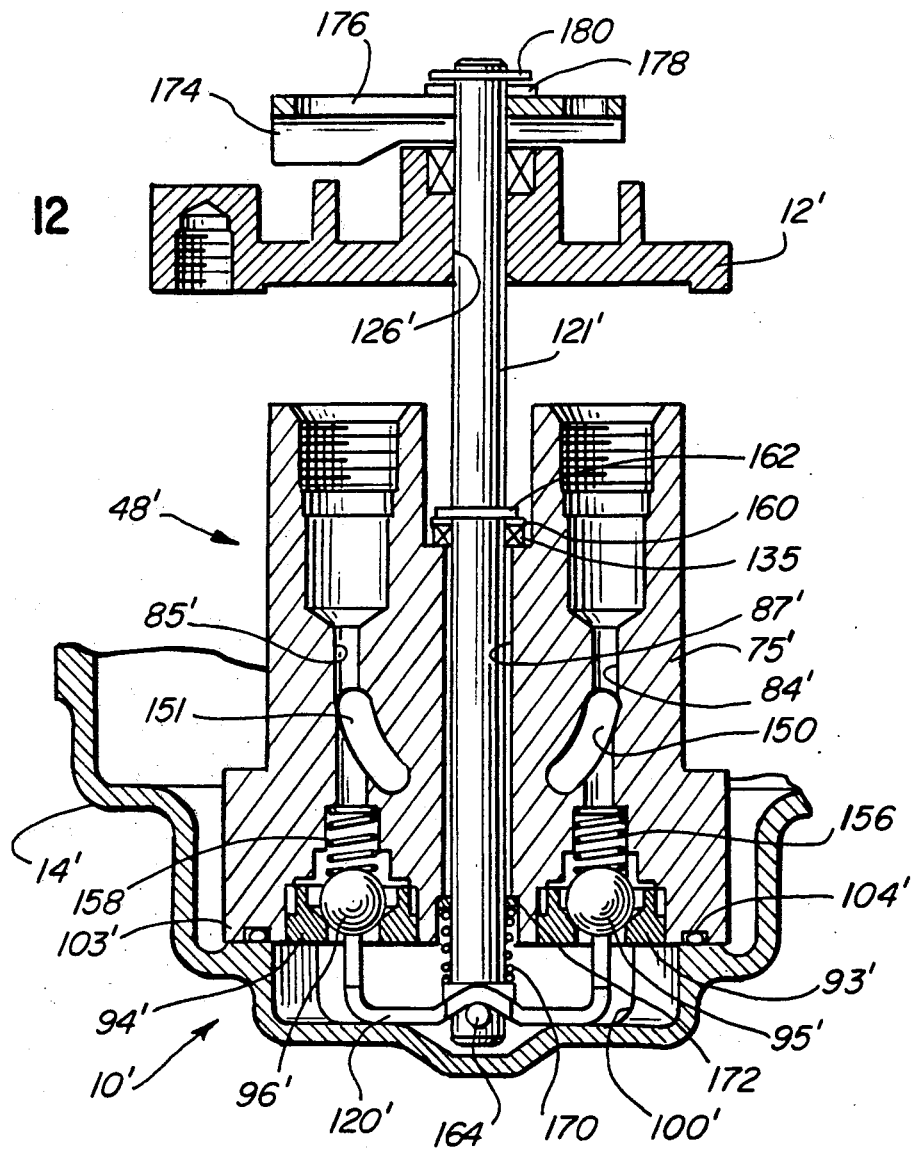
FIG. 12 is a fragmentary vertical section of a preferred embodiment of the hydrostatic transmission on generally the same scale as FIG. 3 and taken through the third and fourth fluid passages and the through bore of the center section.
Figure 13:
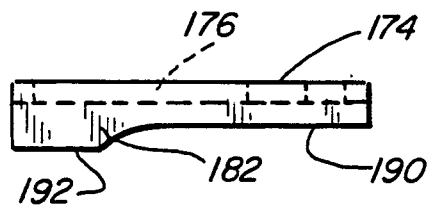
FIG. 13 is a front elevation of the bypass actuator handle.
Figure 14:
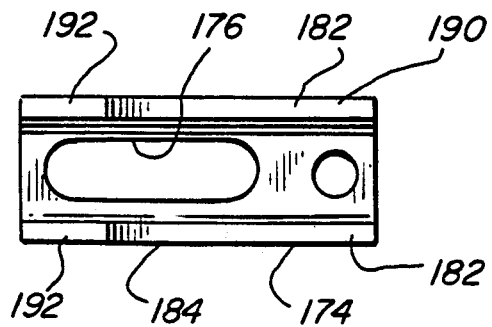
FIG. 14 is a bottom plan view of the bypass actuator handle.

A preferred embodiment of the hydrostatic transmission differs from the embodiment shown in FIGS. 1 to 11 primarily in differences in the structure of the center section located between the pump and motor and the bypass actuator structure for achieving a bypass operation. This preferred embodiment is shown in FIGS. 12 to 14 wherein parts which are the same as those shown in the embodiment of FIGS. 1 to 11 have been given the same reference numeral with a prime affixed thereto.

The center section 48' differs from the center section 48 in having the first fluid passage 150 and the second fluid passage 151 of a different shape. They have an arcuate shape, as shown in FIG. 12, for their entire length to form the arcuate ports at a face of the center section which coacts with the rotatable cylinder block 58 of the motor. The passages also communicate with the arcuate ports on the face of the center section which coacts with the rotatable cylinder block 45 of the pump. The integral part 75' of the center section body which has the third and fourth fluid passages 84' and 85' has the upper ends of those passages shaped to optionally receive a pair of valves, which are not shown since they do not form part of the invention, and alternative to mounting of the valves the upper ends of these fluid passages can be plugged by threaded caps.

The lower housing part 14' is shown broken away and an upper housing part 12' is shown which is suitably connected (not shown) to the lower housing part to define an enclosed housing for the hydrostatic transmission. fluid passages mount the respective valve seats 93'

The lower ends of the third and fourth and 94' and these valve seats have the associated check valve balls 95' and 96' which are urged against the valve seats by associated springs 156 and 158.

The bypass valves are openable for a bypass operation by bypass actuator structure which operates in basically the same manner as the bypass actuator structure shown in FIGS. 1 to 11, but which differs in structural details.

Bypass rod 121' is a straight rod and is of a reduced diameter from the bypass rod 121 of FIGS. 1 to 11 so that the bypass rod can extend straight upwardly from the housing recess 100'. If necessary, a small, adjacent part of the swashplate 54 (FIG. 3) can be removed to enable passage straight up of the straight bypass rod 121'. The bypass rod has the seal washer 135' which is held in position and backed up by a washer 160 and a retaining ring 162 fitted to a groove in the bypass rod 121'. The lower end of the bypass rod 121' extends through a central opening in the bypass actuator plate 120' and is retained in association therewith by a pin 164 extending through the lower end of the bypass rod and engaging in an inverted V-shaped notch portion centrally of the bypass actuator plate. A spring 170 acts between a washer 172 in the through bore 87' and the top of the actuator plate 120' to urge the bypass rod 121' downwardly and urge the seal washer 135' into engagement with a shoulder at the upper end of the passage defined by the through bore 87'.

The bypass actuator plate 120 is lifted to lift the check valve balls off their seats by elevation of the bypass rod 121'. This is accomplished by linear movement of a bypass actuator handle 174 which is shown particularly in FIGS. 13 and 14. The bypass actuator handle has an elongate central opening 176 through which an upper end of the bypass rod extends and the bypass actuator handle is movably captured on the bypass rod by a washer 178 and a retaining ring 180 attached to the bypass rod. The bypass actuator handle has a pair of downwardly-depending flanges 182 and 184, each of which have an inclined cam surface between surfaces 190 and 192 whereby manual force applied to the bypass actuator handle 174 moves the handle toward the right from the position shown in FIG. 12. This will cause the inclined cam surfaces to engage against the upper part of the housing 12' and force upward movement of the bypass rod. When the flange surfaces 192 rest upon the top of the housing part 12', bypass rod 121' is fully elevated and the check valves 95' and 96' are wide open to achieve the bypass operation. At the same time, the seal washer 135' has been raised to open the passage defined by the through bore 87' whereby air bubbles collected in the passage in the clearance surrounding the bypass rod 121' can rise upwardly out of the passage and through oil in the housing to a level above the oil in the housing.

From the foregoing description, it will be seen that the embodiment shown in FIGS. 12 to 14 provides the same functions as the embodiment disclosed in FIGS. 1 to 11 where bleed of air from the oil in the hydraulic circuit is achieved during a hydraulic bypass operation.

I claim:

1. A hydrostatic transmission comprising, a housing with a sump, a pair of hydraulic displacement units in said housing each having a rotatable cylinder block, means extending between said cylinder blocks providing a pair of ports coacting with each cylinder block, a first fluid passage connecting one port of each pair, a second fluid passage connecting the second ports of each pair, a housing recess at the bottom of the housing for holding filtered make-up oil, a pair of bypass valves normally closed to prevent flow of pressure fluid from either of said first and second passages to said housing recess, means operable to open said bypass valves to connect the first and second passages for a bypass operation, a passage extending upwardly from said housing recess and opening to the upper interior of the housing, movable seal means at the upper end of the passage for sealing the passage, and means for opening the seal means in response to opening the bypass valves.

2. A hydrostatic transmission as defined in claim 1 including a filter, and said housing recess has flow communication with the downstream side of said filter whereby there is a source of make-up oil.

3. A hydrostatic transmission as defined in claim 2 wherein said bypass valves are check valves which can open in response to a pressure differential for delivery of make-up oil to one of said first and second passages.

4. A hydrostatic transmission as defined in claim 3 including third and fourth fluid passages communicating with the sump and the first and second fluid passages respectively, and said bypass valves are in said third and fourth fluid passages.

5. A hydrostatic transmission as defined in claim 1 wherein a movable bypass rod extends through said passage for opening said bypass valves, and said movable seal means is a washer mounted on said bypass rod.

6. A hydrostatic transmission comprising, a pair of hydraulic displacement units each having a rotatable cylinder block with a plurality of reciprocal pistons and a swashplate for coacting with the pistons, means extending between said cylinder blocks providing a pair of ports coacting with each cylinder block, a first fluid passage connecting one port of each pair, a second fluid passage connecting the second ports of each pair, means including a substantially sealed housing recess for holding filtered make-up oil, third and fourth passages connecting said first and second passages to said housing recess, a pair of bypass valves in said third and fourth passages normally closed to prevent flow of pressure fluid from either of said first and second passages to said housing recess, means operable to open said bypass valves to connect the first and second passages for a bypass operation, movable seal means above the housing recess for sealing the housing recess, and means for opening the seal means when the bypass valves are opened.

7. A hydrostatic transmission as defined in claim 6 wherein said bypass valves are check valves which can open in response to a pressure differential for delivery of make-up oil to one of said first and second passages.

8. A hydrostatic transmission as defined in claim 6 wherein a passage extends upwardly from said housing recess and said means for opening the bypass valves comprises a bypass rod in and extending lengthwise of said passage and having a washer mounted thereon defining the seal means.

9. A hydrostatic transmission comprising, a housing containing oil, a pair of hydraulic displacement units in said housing each having a rotatable cylinder block, a member extending between said cylinder blocks and having a pair of faces associated one with each rotatable cylinder and each face having a pair of ports, a first fluid passage in said member connecting one port at each face, a second fluid passage in the member connecting the other port on each face, a recess in the lower part of the housing, third and fourth fluid passages intersecting said first and second fluid passages respectively and terminating at said housing recess, a pair of check valves positioned one in each of the third and fourth fluid passages and positioned to be urged against their seats by pressure in said first and second fluid passages, spring means also urging the check valves against their seats, means for simultaneously moving both check valves from their seats to connect said third and fourth fluid passages to said housing recess to achieve a bypass operation, means for bleeding air from the oil in said housing recess during a bypass operation, including a passage in said member extending upwardly from said housing recess and opening to the upper interior of the housing, and means for delivering filtered make-up oil to said housing recess whereby said make-up oil can flow to said first and second fluid passages in response to opening of a check valve by a pressure differential exceeding the force exerted by the spring means.

10. A hydrostatic transmission as defined in claim 9 wherein said means for moving the check valves comprises, a manually operable bypass rod extending lengthwise in said passage, and said means for bleeding air comprises a seal on said bypass rod which normally seals the upper end of said passage and which opens when the bypass rod moves in a bypass operation.

* * * * *